Figure 1:
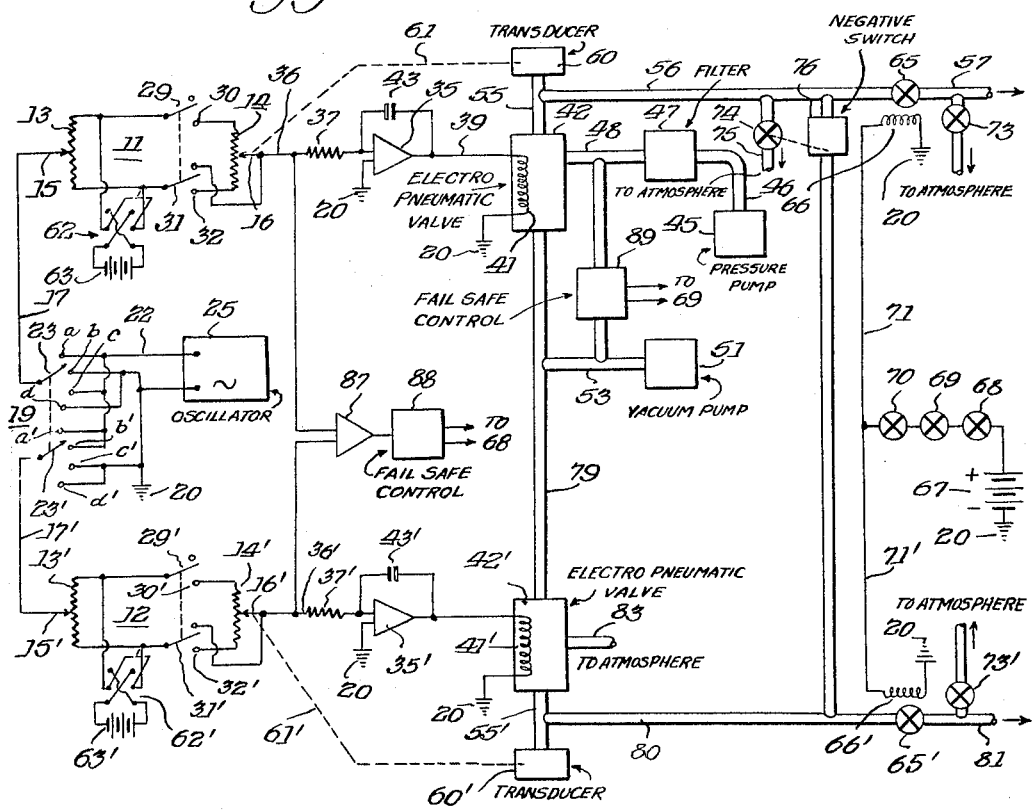

Inventor
Clifford A. Shank.
By Merriam, Smith & Marshall.
Attys.

United States Patent Office 3,263,482
Patented August 2, 1966

3,263,482
PRESSURE ANALOG GENERATING EQUIPMENT
Clifford A. Shank, Santa Monica, Calif., assignor to Shafford Electronics & Development Corporation, a corporation of California
Filed July 11, 1961, Ser. No. 123,174
3 Claims. (Cl. 73—4)

This invention relates to pressure analog generating equipment and is particularly directed to apparatus for generating and controlling pressure conditions through a servo device by converting electrical signals of any desired characteristic into pressure.

In its most general form the invention is directed to a method and apparatus whereby fluid pressures (either liquid or gaseous) may be generated under the control of electrical signals. The pressures that are generated become continuous replicas of selected input signals which are used to control the operation thereby to produce selectively either absolute or differential pressures of either static or dynamic form. In most instances the absolute pressure is desired because this pressure is based upon a consideration of a departure from a perfect vacuum state thereby to furnish a more usable basis from which reference may be made.

In accordance with the present invention pressures are generated which are continuous replicas of any desired controlling input signal. By connecting the apparatus herein to be set forth to an air data system the monitoring and recording of the system input-output characteristics is obtained. Static output pressures are achieved with the apparatus herein described for all cases where the input signal is constant. Sinusoidal pressure results from a sinusoidal signal, and what is known as "ramp" pressure or as a constant rate of change in pressure is an output which is achieved in accordance with the present invention under the control of a constant electrical input signal.

In the prior art, while varying static pressure conditions have been simulated, the devices used for such purpose have generally required an usually complex force rebalance follow-up transducer which not only is heavy but is also expensive and has a generally unpredictable performance characteristic. Generally speaking, the static pressures are representative of either altitude pressure or ram pressure. On the other hand, what is known as "ramp" air pressure (which, illustratively, may be considered as linear pressure) may be considered as being that pressure which results by the action of an aircraft either descending or ascending.

Mach number is obtained by a mathematical ratio of the static pressure (altitude) to the ram pressure. The two forms of the systems, as is herein described, are used to generate the two pressures necessary to simulate Mach number.

In high performance aircraft and at the speeds at which jet craft travel it has long been recognized that the pilot cannot actually fly the plane himself but is required to depend to a large extent upon automatic control systems. Illustratively, there has been for a long period of time considerable dependence upon various types of automatic-pilot and navigational instrumentalities, particularly in the case of military aircraft and for various forms of fire-control devices. In order to establish the necessary control it is important that the Mach number be known and also various functions of the Mach number, such as the true air speed, the instantaneous altitude, the rate of change in altitude, and the rate of change of the Mach number, in order to supply all conditions necessary for proper operation of the control systems. To this end, the apparatus with which this disclosure is concerned provides precise pressure inputs to an air data computer system which receives pressure data from the Pitot-static tube so that the transducers of the computer system can convert the pressures into electrical quantities as though the aircraft were actually flying.

In the problem which confronts designers and aircraft users of air data computer equipment, one of the most difficult areas is that of inadequate pressure generating instrumentation. As a consequence, air data designers suffer both in time spent and money expended in engineering equipment which cannot be proved to meet specification requirements. Airframe users of the air data systems by necessity have to accept the air data systems and install it in aircraft without knowing if performance is acceptable. Many costly and fruitless flight test hours are spent in an effort to determine whether the air data system is compatible to the aircraft, simply because pressure generating instrumentation of the type herein described has not been available.

The present invention serves to meet the foregoing objectives of providing the instrumentation means of determining that air data systems meet their specification requirements, either in the plant or on the aircraft. In aircraft operation and design the most difficult problem to resolve has been the accurate instrumentation where accuracies of determination of minimum incremental deviations as small as one part in 30,000 to one part in 50,000 are expected and for this purpose the apparatus serves as an altitude or ram pressure simulator, as determined by vacuum or positive pressures. For instance, while indeed the obtainment of the Mach number represents a function of both total and static pressures, the apparatus herein described makes it possible to derive expressions which permit the ready simulation of the Mach number, as well as the altitude.

The apparatus herein to be described establishes various operational parameters for different conditions of Mach number, altitude, equivalent altitude and a linearly changing so-called "ramp" pressure. These are programmed into the apparatus by selected internal circuit components preferably in the form of balanced bridges functioning in conjunction with various forms of input signals.

In accordance with the invention herein to be described, the variable dynamic functions are so set up that it becomes possible to generate ramp pressures which simulate altitude instead of pressure and therefore to produce a log pressure ramp function. Other forms will become apparent from what is to follow and accordingly it becomes an object of the invention to provide an electrically programmed device which is arranged to accept digital techniques, as well as analog programming or a combination of both. In this way the apparatus and circuitry to be described herein makes it possible to simulate expected flight conditions whereby a complete air data system can be "flown" and its performance determined prior to actual installation in the aircraft. This provides substantial savings in engineering and flight test time as compared to any attempts to make inflight determination of equipment performance. The apparatus and circuitry of the invention is in no respect dependent upon the working characteristics for its performance so that wide extensions of the broad principles become readily possible and extremely wide pressure ranges of operation are available whereby any selected and possible flight condition may be achieved and simulated.

In the preferred form of apparatus the device incorporates with the electric power supplied to the system an electro-pneumatic servo loop having a high forward loop gain characteristic in which a pressure command signal is summed with a pressure sensing feedback signal in a bridge circuit which becomes the basis of the control to be established. Such errors as inherently tend to result from summing are integrated at the input of a high gain amplifier and are continuously summed to zero at this point. The output from the amplifier is used to proportion the electro-pneumatic valve pressure which will maintain the electric bridge circuit at balance. In this manner static pressure values are produced and repeated in accordance with voltage ratios set up by the pressure selection potentiometer.

With this being done it then becomes possible to introduce sinusoidal or other functional voltages in a series relationship with respect to the bridge circuit in order to provide equivalent pressure analogs at the output load, it being recognized that maximum amplitude and frequence of the functional circuit inputs are limited by the overall loop saturation and frequency response range.

In addition to the static and sinusoidal characteristics, internal generation of positive or negative ramp functions is provided and through the constant summation of the integration of the voltage amplifier to a zero state, a preset bias condition on the bridge circuit with the feed-back loop opening will cause the amplifier current through the electro-pneumatic valve to change at a constant rate which will then be proportional to the integration time constant and the magnitude of the bias voltage. The direction of the ramp is readily reversed by changing the direction of the bias voltage applied and since, with the feed-back cut off, there is no tendency to balance out the bias voltage as the ramp proceeds, ramp linearity is insured from one end of the pressure range to the other.

Still further in the general nature of the apparatus and circuitry herein to be described, provisions are made for fail-safe output protection and are built into the components. Protection is accordingly insured as against damage from any of the possible causes such as power line failure, pneumatic power source failure, malfunctioning of equipment or a reverse or a negative Q or negative pressure condition whereby the static pressure exceeds the ram pressure in the Pitot tube. For the first of the three possibilities last named, provisions are made for immediately locking off the output load from the pneumatic test system. For the latter condition, that is the reverse or negative Q or pressure, this is not always considered a failure but more as a momentary relief measure. For illustrative purposes, the designation "Q" may be considered as being equal to the difference between the total ram pressure (commonly known as "$P_T$") and the static or altitude pressure (commonly known as "$P_S$"). Provision is made whereby, at very low pressures, under some conditions, the system is bled to atmospheric pressures. The foregoing and many other objects of the invention will become particularly apparent when considered in conjunction with the accompanying drawings by which FIG. 1 represents, in schematic form, one circuit and component arrangement which the invention may assume, and FIG. 2, in schematic form, represents the manner in which the apparatus of FIG. 1 is connected to an aircraft, for instance, for making the desired measurements.

Referring now to the drawings and first to FIG. 1 thereof, the circuitry to be described functions in connection with pneumatic apparatus to provide the desired controls, the apparatus is controlled in the illustrated two-channel system of FIG. 1 by electrical circuitry connected to form two Wheatstone bridge circuits schematically designated at 11 and 12. In the consideration of the system to be described, reference will be made largely first to the upper half of the schematic showing of FIG. 1.

In this respect, the bridge circuit 11 is formed from a pair of potentiometers 13 and 14 having a pair of tapping contactors 15 and 16, respectively. The tapping contactors divide the potentiometer so that between the outer terminals of the resistive element and the tapping point on the resistance, two bridge legs are formed. The bridge diagonal in one direction is constituted by the circuitry which is connected between the tapping points.

The potentiometers 14 and 14' are of the conductive film type and will be more particularly discussed in connection with subsequent reference to the transducer 60. The tapping point 15 on the potentiometer 13 may be considered as being adjustable to set the operating functions of the system to the desired pressure value. This tapping point is connected to a conductor 17 which connects through the schematically represented switch 19 and through the switch connects either directly to ground 20 through the indicated conductors connected to tapping points, as shown, or connects to receive the output of an oscillator conventionally represented at 25.

The input voltage to the system, as indicated as available on conductor 22 from the schematically represented oscillator, illustratively may be provided from an oscillator type known as the Hewlett-Packard model 202A function generator or oscillator. The switch 19 comprises two arms 23 and 23' which operate (in any desired fashion) in unison to contact individual ones of the contact points or terminals $a$, $b$, $c$ and $d$ or $a'$, $b'$, $c'$ and $d'$, as the case may be. Of these terminals it will be observed that terminals $b$, $d$, $c'$ and $d'$ all connect the switch arms 23 or 23', and thus conductors 17 or 17', directly to ground. When switch arms 23 or 23' contact terminals $a$, $c$, $a'$ or $b'$ the conductors 17 and/or 17' (as the case may be) connect to conductor 22 to receive the output from oscillator 25.

While the complete instrumentation will be more apparent from what is to follow, it may be remarked at this point that with the switch arms 23 and 23' operating in unison, by virtue of the indicated unicontrol, the conductors 17 and 17' either connect through the switch to the oscillator 25 or to ground, depending upon the switch position. As the switch is shown, four positions are possible and thus the upper and lower channels through the bridge circuits 11 or 12 may be connected to the oscillator 25 or to ground 20 to be placed in a static condition. Illustratively, with switches 23 and 23' in the $a$ or $a'$ position, the channel of each bridge 11 and 12 is driven by the oscillator 25. With the switch arms 23 and 23' in the second position and contacting terminals $b$ and $b'$, the bridge 12 is driven by the oscillator 25 while the bridge 11 connects to ground and is in a static condition. In the third position, with the switch arms 23 and 23' against the contactors $c$ and $c'$, it will be observed that the bridge 11 connects to receive the output of the oscillator 25 and the bridge 12 is in a static position while grounded. In the fourth position, with the arms 23 and 23' against the contact points $d$ and $d'$, each of the bridge circuits 11 and 12 is in a static condition.

At the time when the so-called static condition of operation is desired the switch arm 29 in the bridge circuit 11 is closed upon its lower contacts 30 and, simultaneously, the switch 31 is closed upon its lower contact 32 whereby a balanced bridge circuit is provided and the input to the summing amplifier 35, later to be further described, is derived by the voltage available across the diagonal of the bridge circuit 11 between the contacts 15 and 16 as supplied through conductor 36 and resistor 37. The amplifier 35 supplies its output current through a conductor 39 to a coil 41 of an electro-pneumatic valve, schematically represented at 42. One terminal of the coil 41 is grounded, as indicated at 20. Feed-back from the amplifier output to input is provided by way of the feed-back condenser 43 and the amplifier so functions as to tend to keep the signal input at zero when controlled operation takes place.

The amplifiers 35 and 35' have been only schematically represented for reasons of simplicity. These are feed-back operational D.C. amplifiers with the indicated capacitors 43 and 43' providing the feed-back paths. As will be appreciated, the capacitor elements offer relatively low impedance to fast changing or dynamic signals, which may be looked upon as if acting somewhat like a short circuiting component with respect to rapidly changing dynamic signals. Accordingly, for fast changing input signals on conductor 36, as occur during transient or dynamic conditions of the signal, the amplifier gain is reduced and thus stabilization of the servo loop is established.

During a steady state condition of input on the conductor 36, however, the capacitors 43 and 43' act as a very high impedance and thus provide practically open circuit condition and no feed-back. This allows the amplifier 35 to operate at a full gain state and to provide high accuracy to static pressure values.

With ramp mode of operation in effect, the voltage passed through the conductor 36 and the resistor element into the amplifier 35 is derived from the connection 15 to the potentiometer 13 which acts as a voltage divider. This condition is analogous to a condition of permanently unbalanced bridge circuit which is indicated by a transient type signal. For this condition the amplifier output is maintained on the signal output conductor 39 and supplied to the winding 41 of the torque-motor type valve 42 or any other valve with similar transfer conditions may be utilized. A continued current flow through the winding 41 has the effect of endeavoring to try to correct the valve to a pressure state representative of the error signal and at a rate determined by the time constant of the capacitor 43 and the resistor 37, with the current through the valve winding 41 continuously changing at a constant rate. Valves 42 and 42' may be of the well known type of Foxboro K-108-PF. By this state of operation, the amplifier 35, while changing the output pressure from the valve 42 and thus establishing a control effect, as will later be apparent, is unable to establish the bridge circuit balance because of the fact that the switches 29 and 31 are so placed that the potentiometer of the bridge circuit is disconnected. Consequently, with increasing time, the valve 42 keeps putting out more and more pressure to provide the ramp functioning.

If it is desired that the rate of change shall increase, of course, it will be apparent that this can be done by changing the time constant of the feed-back circuit comprising the capacitor 43 and the resistor 37, a reduction of the value of either or both of which will reduce the time constant and make the rate faster. Also, the effect could be provided by increasing the voltage that is set up by the potentiometer 13 by reason of the connection of the tapping point 15 thereon. In the majority of operations, the rate of change of control is most readily and most easily established by adjusting the position of the contactor 15 on the potentiometer 13 thereby to provide for ramp function generation. The foregoing has been considered mainly with respect to the upper channel including the bridge circuit 11 but it will be understood that the description applies equally well to the lower channel with the bridge circuit 13 and the amplifier 35'. The type of functioning operation in each of the channels is determined by the switching position of switch unit 19.

In generating and developing the pressure conditions and in cooperation with the amplifier-controlled valve mechanism 42 (schematically represented) a suitable pressure pump, such as that schematically represented at 45, is provided to generate the pre-established pressure usually considered as being of the order of about 40 p.s.i.g. (this is approximately 54 p.s.i.a.). The pressure developed by the pump 45 is supplied by way of the tube 46 and any suitable form of filter, such as that schematically represented at 47, which removes by screening any dirt and water which may be circulated by the pump and which might appear in the tube 46. This is done with the view to protecting the remaining apparatus wherein sensitive valves and the like are utilized.

The filtered fluid output from the pump 45 is then supplied by way of the tube 48 to one side of the electro-pneumatic valve 42. Simultaneously, there is supplied to the electro-pneumatic valve 42 a substantial vacuum (for instance, this might be represented as about 3 p.s.i.a.) which is generated in the vacuum pump 51 and which is made effective at the valve 42 by way of the tubes 53 and 54 connecting the valve and pump. The electro-pneumatic valve 42 is essentially a pressure differential valve of the torque-motor type which may be likened to a pneumatic potentiometer. The valve essentially includes a diaphragm member to which the pressure of the pump 45 is applied at one side and to which the vacuum from the pump 51 is applied to the other side to control the valve operation or opening. One suitable type of electro-pneumatic valve 42 is that which is known as the Foxboro type K-108-PF, manufactured by the Foxboro Co. at Foxboro, Massachusetts. In this connection, the valve is normally included within a housing or casing. The valve, per se, includes a bellows element. As indicated, the vacuum pump is connected into the valve and, as here shown, vacuum pump 51 through the tube 53 connects into the housing or casing for the valve. The high pressure pump 45, through the filter 47 and the tube 48, connects to the valve within the casing and thus into the interior of the bellows, thereby to establish the pressure differential, as above noted, between the interior and exterior of the valve. The valve 42 is not necessarily a Foxboro valve but may be any type of valve to provide the transfer function that is represented by pressure outputs, which are replicas or analogs of the electrical commands put in. The Foxboro valve is one form which is quite suitable for this purpose. The valve is of the low-inertia type and, being actuated by the torque-motor effect, can, in most respects, be likened to a pneumatic "potentiometer" because it provides in the output tube 55 a pressure which is proportional to the current flowing through the winding 41 and constituting the controlling force on the torque motor. This output pressure, accordingly, can be considered generally as being a pressure which represents the demanded finite value of the total applied pressures from pumps 45 and 51. Thus, the pressure will lie between that provided by the pressure pump 45 and the vacuum pump 51. The pressure available at the output side of the valve in the output tube 55 is then controlled by the current flowing through the control winding 41. That valve pressure which is available on the remote or output side in the tube 55 is the output pressure from the system.

The fluid pressure output of valve 42 is applied, on the one hand, through the tube 55 and the connecting tube 56 to the outlet point 57 whereat a connection is made to provide the ram or total pressure at the Pitot tube of the aircraft in which the simulated conditions are to be developed. The same output pressure from the electro-pneumatic valve 42 is also supplied to the pressure transducer, which is conventionally known at 60. The transducer 60 is adapted to sense the pressure of the valve 42 representing the output pressure. The transducer 60 functions as a feed-back transducer and is usually in the form of a capsule displacement-type of device which essentially is in the form of a bellows tending to compress or expand in accordance with the pressure on the input through the tube 55. The pressure transducer 60 has a diaphragm to sense and convert the pressure at the tube 55 into an electrical signal dependent upon the compression or the contraction thereby and to provide thereby electrical output information which is a function of the input pneumatic information so that there results a voltage ratio effect derived from pressure.

Transducer 60, which is schematically illustrated, is preferably a transducer of the type known as the "Series 6000" manufactured by Computer Instruments Corp. of Hempstead, New York. It comprises essentially a closed container having an inlet opening which is adapted to be connected to an inlet tube, such as tube 55. Supported within the container is an evacuated capsule of generally pillow-like formation having one surface thereof fixedly supported and having the opposite free surface thereof connected to the so-called "swinger" or adjustable contactor of a potentiometer. The evacuated capsule is of the type which is adapted to expand or contract with pressure changes of decreasing or increasing value on its outer surface, such as that pressure which is imposed thereon through the tubular connection 55 leading from the servo valve 42. The contactor of the potentiometer (here schematically shown by components 61 and 16) is adapted to slide across the conductive film to provide an infinite resolution type of potentiometer. The contactor per se includes no bearings or linkages to cause friction and contact position at different points on the conductive film (and thus, effectively, contact of slider 16 on resistor 14) is electrically equivalent to the diagrammed showing of the adjustable contactor 16 with respect to the indicated resistive element 14. In the electrical sense, there are conductors (not shown) leading out from the pressure transducer 60 which make connection with the terminal transducer 60 which make connection with the terminal points 30 and 32, respectively, so that with the switch arms 29 and 31 in their position to close against the contacts 30 and 32, connection is made as indicated to the conductor 36. With the switch arms 29 and 31 in their upper position, the conductive film is effectively removed from the circuit.

In accordance with the flexure of the diaphragm within the transducer 60 functioning by way of the connector 61 (actually, the connector is already set forth in what has preceded) secured at one point to the bellows there are no linkages or gearings to cause friction. When the transducer 60 operates to place the circuit in the state indicated schematically by the connection 61, the bridge circuit is adjusted to a point whereat a balanced condition is reached and the input voltage available to the amplifier 35 is so adjusted that a zero signal input is reached and the current flow to the electro-pneumatic valve 42 is held constant at that condition whenever the balanced condition is arrived at. For this condition, it will be appreciated that the switch 62 connected to the bridge diagonal between the conjunctions of the ends of the resistance elements of the two potentiometers 13 and 14 is in one position which is correct for this mode of operation. The switch 62 is so arranged that the source 63 supplies either a positive or negative voltage, as desired, for the ramp mode of operation.

It will be noted that, in the output connection from the electro-pneumatic valve 42, as available in the tubes 55 and 56 and directed to the tube end-point 57, there is a shut-off valve schematically represented at 65. This valve is a standard electromagnetic type normally held in a closed position but during the operation of the system, it is opened by the magnetic winding 66 being energized from a suitable voltage source 67. The source 67 is connected to the winding 66 through three serially connected switch elements 68, 69 and 70 which are connected, in turn, to the conductor 71 which completes the circuit from ground 20 through the source 67, the switches 68, 69 and 70 and the conductor 71 and the coil or winding 66 back to ground so that the valve 65 is held open.

The switches 68, 69 and 70, respectively, represent fail-safe switches serving to open and to close off the system any time there is a failure in the electrical power, a malfunctioning of the equipment or in the pneumatic supply, all of which will be later discussed. Likewise, with the closure of the valve 65, provision is made so that part of the system beyond the valve and leading into any suitable form of indicating apparatus (not shown) or to the equipment in the aircraft, it is possible to bleed the system as desired to atmospheric pressure. For this purpose, a valve conventionally represented at 73 is connected between the shut-off valve 65 and the end 57 of tube 56 so that with the valve 73 open, there is an opening to atmosphere. A similar type of valve 74 leading outwardly at 75 to the atmosphere is also provided on the opposite side of the valve 65 and between valve 65 and the transducer 60. This valve is preferably controlled under the influence of the schematically represented reverse pressure safety switch 76 which connects through the tube 77 to the tube 56 wherein the ram or total pressure is developed and through the tube 79 to the tube 80 wherein the static pressure is preferably developed for conditions when static and ram pressures are concurrently being produced. For conditions when both channels in the system are producing static pressures, of course, the resultant pressures may or may not be equal but it will be apparent, from the connection shown, that the pressure in the tube 80 will not exceed that in tube 56.

For the development of static pressures in the channel shown as the lower part of FIG. 1, like components representing similarly or like functioning units are not further described. However, it will be noted that the output from the amplifier 35' controls the operation of the electro-pneumatic valve 42' in a manner generally similar to that already discussed above in connection with the description of the electro-pneumatic valve 42. However, in this instance, it will be noted that in contrast to the high pressure of the pump 45 being effective on the valve, the atmosphere pressure available at the inlet 83 represents the higher of the two pressures available and, consequently, the output from the electro-pneumatic valve 42' as available in the tube 80 and as available in the pressure transducer 60' will be the difference between the minimum available as a result of the vacuum established by the pump 51 and atmospheric pressure available at the input 83.

For the foregoing conditions the static mode has been described with the tapping points 15 and 15' on the potentiometers 13 and 13' being set to the desired pressure. For conditions where ramp modes are to be considered, some slight changes in the operation are provided. Instead of connecting the switch arms 29 and 31 or 29' and 31', as the case may be, to the lower terminals 30 and 32 on the one hand or 30' and 32' on the other hand, the switch arms are connected to the upper terminals indicated. For this condition it will be seen that the same potentiometer 13 or 13' is used for either the static or the ramp selection but that the transducer potentiometer 14 or 14' is open and removed (in effect) from the circuit so that no non-linearity to the ramp conditions can be introduced. In this event the voltage applied into the amplifiers 35 is that established by contactor 15 of potentiometer 13 acting as a voltage divider from the voltage source 63 which is fed into the conductor 36 and the resistor 37 into the amplifier. Depending upon the direction desired, that is whether there shall be an increasing or a decreasing ramp condition, the switch 62 or 62' is thrown one way or the other.

The oscillator 25 is not normally connected in the circuit during the ramp mode of operation. At such times the switch component 19 is normally set to ground each of the bridge circuits 11 and 12 when the ramp mode is being used. In rare instances, it might be required to superimpose sine waves on the ramp but this would not normally be the case. The input from the oscillator 25 is normally used only when the system is producing static pressures. With the switch 19 in other positions it can be seen that one channel, that is the channel including bridge circuit 12, may represent a static condition, whereas the other channel, including the bridge circuit 11, may indicate a ramp condition.

In the operation the schematically indicated amplifier 87, it will be seen, connects to each of the conductors 36 and 36' so that in the event of malfunctioning of the system an unbalanced condition of the input may be realized whereby output from the amplifier will control the operation of a fail-safe relay, schematically represented at 88, and through this connection control the opening or closing of the switch 68 whereby the windings 66 and 66' serving to hold the valves 65 and 65' open are de-energized whereupon the valves normally close.

A further safety measure incorporated into the apparatus is that of a failure of the pneumatic supply system represented by the pressure pump 45 and the vacuum pump 51 from which it will be observed that the tubes 48 and 53 each lead into the fail-safe component 89 which, in turn, connects to the switch represented at 69. The fail-safe component 89 is a normal type of pressure operated switch and is thus schematically shown.

Lastly, the negative Q switch 76 functions at times when the pressure in the static tube 80 exceeds that in the tube 56. Failure of any of the electrical, pneumatic equipment immediately cuts off the system and locks off the output load from the test system. The failure resulting from the negative Q switch functions as a more or less momentary relief pressure and is usually set so that a pressure switch which operates at a very low pressure such as −0.1 p.s.i. serves to bleed the tube 56 to atmospheric pressure. The protection due to equipment malfunctioning is the type which results should there be any output pressure in the system not in accordance to the normal voltage appearing at the bridge output, bearing in mind that from the above description the bridge output is zero for all normal conditions. Under the circumstances, a differential amplifier 87 which connects to receive the output of the bridges 11 and 13 functions to produce a signal output available at the control relay 88 to shut off the system or open the switch 68 at times when an abnormal bridge unbalance occurs.

Various types of control apparatus may be utilized in this assembly but illustrative of one which has been found suitable is the combination of the pressure pump 45 and the vacuum pump 51. For convenience of diagrammatic showing, pressure pump 45 and vacuum pump 51 are shown as separate units. In actual practice the two components are usually formed in one machine which supplies both pressure and vacuum. One suitable form of machine is a standard type, such as that known as the dry unit (oil free), which is manufactured by the Great Lakes Manufacturing Corp. and known as its model 101–445.

The transducers 60 and 60' are preferably of the type already mentioned, with one in each system, that is in the ram and the static systems. The function generator in the form of the oscillator 25 may be of any desired type such, for instance, as the Hewlett-Packard model 202A.

If desired, a recording of the pressures available in the output tubes 56 and 80 may be provided by connecting a transducer and appropriate recording element in the output section of the tubes between the valve 65 and the output connection 57 or the valve 65' and the output connection 81. Further than this, in order to generate ramp pressures which simulate altitude ramp instead of pressure ramp (it being borne in mind that altitude does not change linearly with pressure but more as a log function) it will be apparent that the circuit described functions from the constant predetermined voltage available from the sources 63 or 63' as desired.

Figure 2:
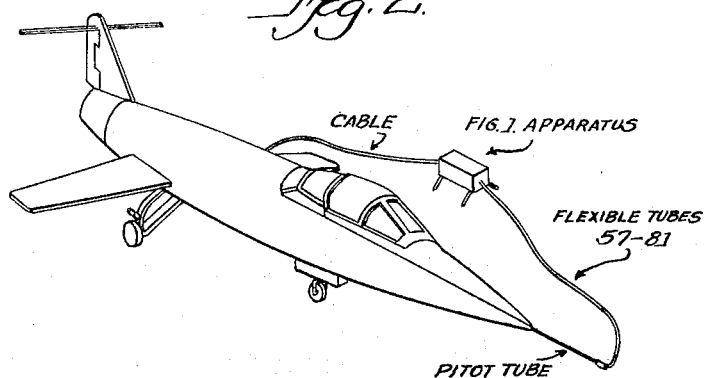

In FIG. 2 of the drawing there is shown schematically the type of connection made between the output tube 57 and 81 to the Pitot static boom of the aircraft and indicates also the electrical cable reading out answers and data to any suitable apparatus from the air data computer system contained within the aircraft.

The foregoing detailed description has been given for clearness of understanding only, and no unnecessary limitations should be understood therefrom, as modifications will be obvious to those skilled in the art.

Having now described the invention, what is claimed is:

1. Circuitry for selectively developing fluid pressure outputs indicative of static and ramp conditions for aircraft comprising a feed-back amplifier, means for producing pressure conditions above atmospheric, means to produce pressure below atmospheric, an electro-pneumatic valve connected to each of the pressure producing means, an output tube connected to said valve so that a pressure is produced which is the output pressure differential, means to control the electropneumatic valve from said amplifier to establish the pressure differential in the output tube as developed from each of said pressure differential producing means, a bridge circuit, means to connect the input circuit of the amplifier across one of the bridge diagonals to determine the current flowing through said amplifier in accordance with the balanced and unbalanced condition of the said bridge circuit, fluid transducer means connected to receive a fluid input pressure corresponding to that available in the output tube from said valve, means controlled by said transducer for returning the bridge circuit to a balanced state in its static operational mode and thereby reduce the amplifier input to substantially a zero value, switch means for transforming the bridge circuit from a static to a ramp condition and removing the output effect of the fluid transducer on the amplifier input during a ramp condition of operation, and means for supplying a controllable input signal of selected polarity to the amplifier for producing changing amplifier outputs and resultant pressure changes in the output of the electro-pneumatic valve during a controllable state of operation indicative of ramp conditions.

2. The circuitry claimed in claim 1 comprising, in addition, means to determine the rate of change of output current from the amplifier for controlling the rate of operation of the electro-pneumatic valve by controlling the time constant of the amplifier feed-back circuit.

3. The circuitry claimed in claim 1 comprising, in addition, means to determine the rate of change of output current from the amplifier for controlling the output pressure available by adjusting the magnitude of signal input over to adjacent legs of the bridge.

References Cited by the Examiner

UNITED STATES PATENTS

| | | | |
|---|---|---|---|
| 2,843,147 | 7/1958 | Penther | 137—487.5 |
| 2,863,287 | 12/1958 | Berkman | 137—487.5 X |
| 2,938,536 | 5/1960 | Ehremberg | 137—487.5 X |
| 3,005,135 | 10/1961 | Palmer | 137—487.5 X |
| 3,089,331 | 5/1963 | Sharko | 73—4 |
| 3,104,540 | 9/1963 | Vitale | 73—4 |
| 3,106,084 | 10/1963 | Hoffman | 73—4 |

LOUIS R. PRINCE, *Primary Examiner.*

M. CARY NELSON, *Examiner.*

S. C. SWISHER, *Assistant Examiner.*